Aug. 19, 1952  A. F. WEGS  2,607,247
OPTICAL PLIERS
Filed June 3, 1949
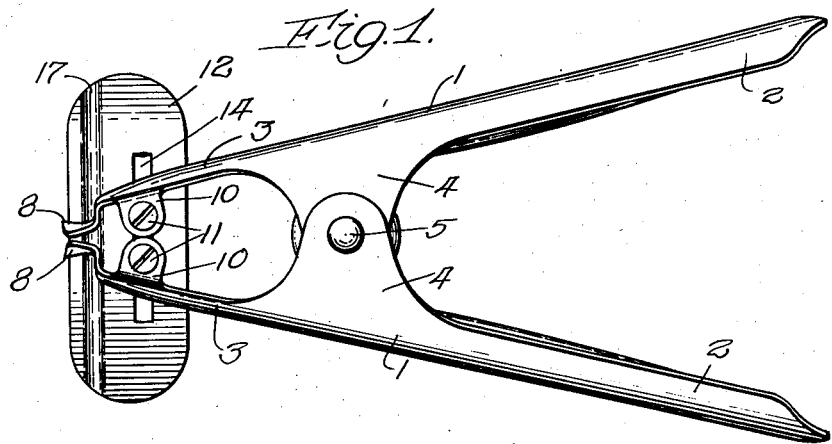
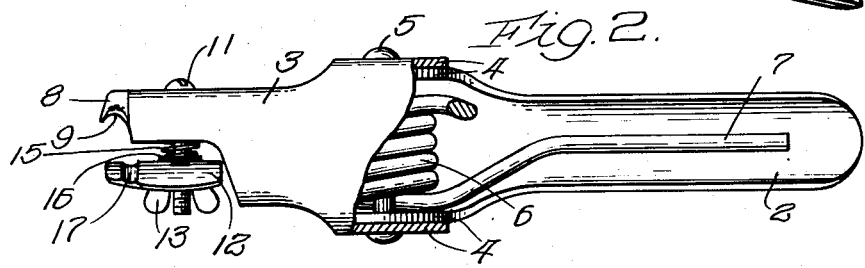
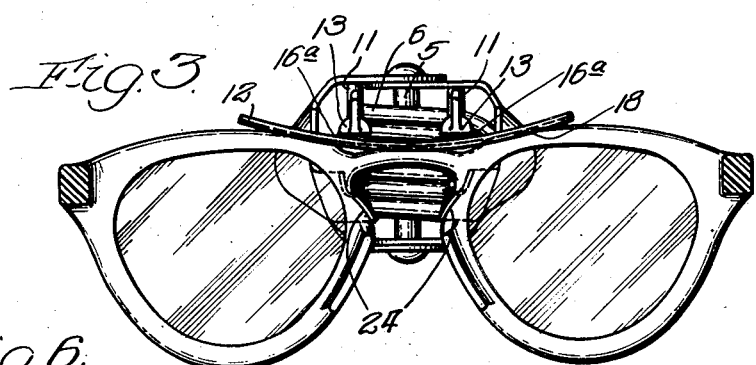
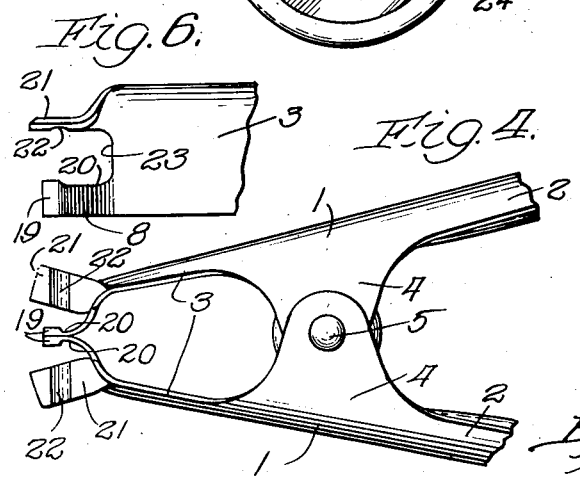
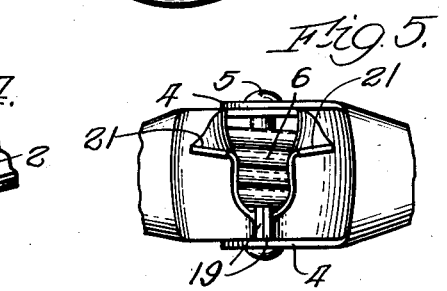
Inventor:
Arthur F. Wegs,
By Schroeder, Merriam,
Hofgren & Brady, Attys.

UNITED STATES PATENT OFFICE

2,607,247

OPTICAL PLIERS

Arthur F. Wegs, Chicago, Ill., assignor of one-half to Harvey C. Speck

Application June 3, 1949, Serial No. 97,045

9 Claims. (Cl. 81—3.6)

This invention relates to optical pliers and more particularly to pliers of a character adapted to be used for spreading the nosepiece of eyeglass frames of the heavier type, such as those made of plastic, bone, shell and similar materials.

It is an object of this invention to provide an instrument which may be quickly and easily used to spread the nosepiece of an eyeglass frame.

Another object of this invention is to provide a pair of optical pliers which may be readily adjusted for use upon any size of eyeglass frame.

A further object of this invention is to provide optical pliers for spreading the nosepiece of an eyeglass frame, which pliers are provided with means for positively gripping the nosepiece of the eyeglass frame and at the same time being capable of preventing any slipping or twisting of the frame.

The invention will be more particularly described with reference to the drawings, in which:

Fig. 1 is a plan view of a pair of optical pliers embodying this invention;

Fig. 2 is a side elevation of the pliers shown in Fig. 1, partly broken away to show the interior structure thereof;

Fig. 3 is an end view looking from the left in Fig. 2, showing the pliers engaged upon an eyeglass frame;

Fig. 4 is a partial plan view of a second embodiment of this invention;

Fig. 5 is a vertical end view of the pliers shown in Fig. 4; and

Fig. 6 is a fragmentary side elevation of the nose of the pliers shown in Fig. 4.

In the ordinary optical supply house in which it is contemplated that the device of this invention would be used, a plurality of fitting tables are usually provided for the patrons. Each fitter would ordinarily have a pair of optical pliers such as shown in Figs. 4, 5 and 6, at his fitting table, and the supply house could have just one of the adjustable optical pliers shown in Figs. 1, 2 and 3. Although it is thus contemplated that a larger quantity of the pliers of the embodiment shown in Figs. 4–6 would be used, the adjustable pliers shown in Figs. 1, 2 and 3 is the preferred embodiment.

The pliers comprise a pair of body members 1 which are slightly channeled and have handle portions 2 and nose portions 3 defined by those portions of the body members on opposite sides of the pivot. Each body member has a pair of lugs 4 which extend perpendicular to the axis of the body member. The lugs are joined together with a pin 5 to provide for pivotal movement of the body members. The pivot pin 5 is disposed between the body members 1 so that when the handle portions 2 are moved toward each other, the nose portions 3 will move away from each other. A spring 6 is wrapped around the pin 5 and has legs 7 pressed against the opposite handle portions 2 to yieldably hold the handle portions apart.

Referring now particularly to Figs. 1, 2 and 3 each nose portion 3 of the body members I have formed at their extremity a jaw 8. This jaw has a concave portion 9 which is adapted to grasp the inner edge 24 of the nosepiece of an eyeglass frame as best seen in Fig. 3. Adjacent the jaws 8 are lugs 10 having a threaded aperture therein and supporting a screw member 11 threaded in the aperture. A backing member 12 comprising a curved plate is mounted and retained upon the screw members 11 by wing nuts 13. The screw members 11 extend through a slot 14 in the backing member 12. The screw members 11 travel in the slot 14 in a direction parallel to the movement of the jaw members thus keeping the backing member 12 in proper relation to the eyeglass frame when the pliers are used to spread the nosepiece of the eyeglass frame. A spring 15 is mounted around the screw 11 and bears against the lug 10 and a washer 16 which bears against the backing member 12. A washer 16a is also placed between the wing nuts 13 and the backing member 12. The spring 15 thus keeps the backing member 12 spaced from the jaws 8. The distance betwen the backing member and the jaws can be varied by turning the wing nuts 13 upon the screws 11. The backing member 12 has a longitudinal groove 17 which is adapted to engage the upper edges 18 of the eyeglass frame as shown in Fig. 3. The backing member thus prevents the frame from twisting or turning upon the jaws 8 when the jaws are spread apart against the inner edges 24 of the eyeglass frame.

The pliers shown in Figs. 1, 2 and 3 can be adjusted as described above, to fit all sizes and shapes of eyeglass frames.

Referring now to Figs. 4, 5 and 6, each nose portion 3 of the body members I has a jaw 8 at the extremity thereof, provided with an enlarged portion 19 at its tip. Immediately adjacent the enlarged portions 19, a channel or concave portion 20 is provided for grasping the inner edge 24 of the nosepiece of the eyeglass frame. The opposite side of each nose portion 3 is turned sufficiently from the plane of the jaw 8 to provide a backing member 21. The backing member 21 has a longitudinal groove 22 adapted to engage the upper edges 18 of the eyeglass frame in a manner similar to that described for the groove 17 in the backing member 12. The distance between the jaws 8 and the backing members 21 of the embodiment shown in Figs. 4, 5 and 6 remains constant. A part of the nose portion 3 is cut away from the jaws 8 and the backing member 21 to form a recess 23 providing an opening for the bridge of the eyeglass frame to fit into.

The embodiment of the invention described in the preceding paragraph is an optical pliers which will fit most eyeglass frames. When an operator finds that this instrument will not fit the eyeglass frame, the adjustable optical pliers shown in Figs. 1, 2 and 3 should be used.

The pliers of both embodiments are operated in the same manner. The handles 2 are grasped in one hand and the pliers and eyeglass frames brought together before spreading the jaws 8. The upper edges of the eyeglass frame are positioned in the groove provided in the backing member 12 or 21. The jaws 8 may now be spread apart by gentle but firm clasping pressure on the handles and the frame position so that the jaws engage the inner edges of the nosepiece. Additional movement of the handles together will spread the jaws 8 and thus the nosepiece of the eyeglass frame.

Having described my invention in relation to the embodiments shown, it is my intention that the invention shall not be limited thereby, but shall be construed within the scope and spirit of the appended claims.

I claim:

1. Optical pliers of the character described, including: a pair of spaced body members pivotally connected intermediate their ends, said body members having handle portions and nose portions and each lying on one side of the pivot so that movement of said handle portions together simultaneously moves said nose portions apart; a spreader jaw at the end of each nose portion adapted to grasp the inner edge of the nosepiece of an eyeglass frame; backing means adjacent to and spaced from said jaws, said backing means having a groove therein facing the jaws and extending in the direction of movement of said jaws, said groove being adapted to receive the upper edges of an eyeglass frame to prevent slipping or twisting movement of the frame when said jaws are moved apart to spread the bridge of the eyeglass frame.

2. Optical pliers of the character described, including: a pair of spaced body members pivotally connected intermediate their ends, said body members having handle portions and nose portions; spring means normally forcing said handle portions apart and said nose portions together; a jaw at the extremity of each nose portion having a relatively thick portion at the tip of the jaw and a relatively thin portion adjacent the tip forming a groove adapted to receive the inner edges of the nosepiece of an eyeglass frame; backing means adjacent to and spaced from said jaws, said backing means having a groove therein facing the jaws and extending in the direction of movement of the jaws for receiving the upper edges of an eyeglass frame to prevent slipping or twisting of the frame when said jaws are moved apart to spread the nosepiece of the eyeglass frame.

3. Optical pliers of the character described, including: a pair of slightly channeled body members having handle portions and nose portions, a pair of integral lugs extending normally to the axis of each body member intermediate its ends and a pin connecting said lugs to provide pivotal movement of said body members; a jaw at the extremity of each of said nose portions, each jaw having a cut-out portion spaced from the tip of the jaw adapted to receive the inner edge of the nosepiece of an eyeglass frame; backing means adjacent to and spaced from said jaws, said backing means having a groove therein facing said jaws and extending in the direction of movement of said jaws for receiving the upper edges of an eyeglass frame to prevent slipping or twisting of the frame when said jaws are moved apart to spread said nosepiece.

4. Optical pliers of the character described, including: a pair of spaced body members pivotally connected intermediate their ends, said body members having handle portions and nose portions; a spreader jaw at the extremity of each nose portion, said jaws being adapted to grasp the opposite inner edges of the nosepiece of an eyeglass frame; a backing member adjacent to and spaced from said jaws, comprising a curved plate adapted to contact the upper edges of the eyeglass frame to prevent slipping or twisting of the frame when said jaws are moved apart to spread the bridge of the eyeglass frame.

5. Optical pliers of the character described, including: a pair of spaced body members pivotally connected intermediate their ends, said body members having handle portions and nose portions; spring means normally holding said handle portions apart and said nose portions together; a jaw at the extremity of each nose portion, said jaws having an enlarged tip portion and a recessed portion adjacent said tip portion for grasping the opposite inner edges of the nosepiece of an eyeglass frame, a backing member adjacent to and spaced from said jaws comprising, a curved plate having a groove therein facing said jaws and extending in the direction of movement of said jaws for receiving the upper edges of the eyeglass frame to prevent slipping or twisting of the frame when said jaws are moved apart to spread the bridge of the frame.

6. Optical pliers of the character described, including: a pair of slightly channeled body members having handle portions and nose portions, a pair of parallel lugs integral with each body member intermediate its ends and extending normal to the axis of said body member, a pin connecting said pairs of lugs to provide pivotal movement of said body members; a jaw at the extremity of each nose portion, said jaws each having a channel portion spaced from the tip of the jaw and contoured to the shape of the inner edge of the nosepiece of an eyeglass frame for grasping said edges, a backing member adjacent to and spaced from said jaws comprising a curved plate mounted on screw members adjustably connected to said nose portions adjacent said jaws, said curved plate having a groove therein extending in the direction of movement of said jaws for receiving the upper edges of the eyeglass frame to prevent slipping or twisting of the frame when said jaws are moved apart to spread said nosepiece.

7. Optical pliers of the character described, including: a pair of slightly channel body members having handle portions and nose portions, a pair of parallel lugs integral with each body portion intermediate its ends and extending normal to the axis of said body portion, a pin connecting said pairs of lugs to provide pivotal movement of said body members; a jaw at the extremity of said nose portion, said jaws each having a channel portion spaced from the tip of the jaw and contoured to the shape of the inner edge of the nosepiece of an eyeglass frame for grasping said edges; a backing member adjacent to and spaced from said jaws comprising a curved plate having a slot therein extending in the direction of movement of said jaws, a pair of screw members extending through said slot and mounted on lugs integral with said nose portions, a nut on each of said screw members for moving said plate relative to said jaws and a spring surrounding each of said screw members and bearing against said lugs and said plate, said plate having a groove therein adapted to receive the upper edges of the eyeglass frame to prevent slipping or twisting of the frame when said jaws are moved apart to spread said nosepiece.

8. A pair of optical pliers of the character described, including: a pair of body members pivotally connected intermediate their ends, said body members having handle portions and nose portions and each lying on one side of the pivot so that movement of said handle portions together simultaneously moves said nose portions apart; a spreader jaw at the extremity of each nose portion, said jaws being integral with said nose portion and adapted to grasp the opposite inner edges of the nosepiece of an eyeglass frame; a backing member projecting from the extremity of each nose portion and integral therewith, said backing members being spaced from said jaws and adapted to bear against the upper edges of the eyeglass frame to prevent slipping or twisting of the frame when said jaws are moved apart to spread said nosepiece.

9. Optical pliers of the character described, including: a pair of spaced slightly channeled body members pivotally connected intermediate their ends, said body members having handle portions and nose portions; spring means normally forcing said handle portions apart and said nose portions together; an integral jaw at the extremity of each nose portion, said jaws each having an enlarged tip portion and a channel portion adjacent the enlarged portion adapted to receive the inner edge of the nosepiece of an eyeglass frame; an integral backing member at the extremity of each nose portion, said backing member being spaced from said jaws and having a groove therein facing said jaws for receiving the upper edges of the eyeglass frame to prevent slipping or twisting of the frames when said jaws are moved apart to spread said nosepiece.

ARTHUR F. WEGS.

REFERENCES CITED

The following references are of record in the file of this patent:

UNITED STATES PATENTS

| Number | Name | Date |
| --- | --- | --- |
| 514,799 | Wildt | Feb. 13, 1894 |
| 1,197,502 | Lamb | Sept. 5, 1916 |
| 1,638,078 | Bell | Aug. 9, 1927 |
| 2,112,647 | Bouchard | Mar. 29, 1938 |